United States Patent [19]
Anzai et al.

[11] 3,768,038
[45] Oct. 23, 1973

[54] SELECTABLE PULSE WIDTH MODULATOR
[75] Inventors: Hiroshi Anzai; Seiichi Saito, both of Tokyo, Japan
[73] Assignee: Kabushikikaisha Tokyo Keiki, Tokyo, Japan
[22] Filed: Sept. 14, 1972
[21] Appl. No.: 289,171

[30] Foreign Application Priority Data
Sept. 20, 1971 Japan....... 46/85593 (utility model)

[52] U.S. Cl............. 332/9 R, 307/88 MP, 307/265, 328/58, 328/65, 332/12
[51] Int. Cl. .............................................. H03k 7/08
[58] Field of Search ...................... 332/12, 9 T, 9 R; 325/142; 328/58, 65; 307/265, 88 MP

[56] References Cited
UNITED STATES PATENTS
3,296,551  1/1967  Staples............................. 328/65 X
3,432,679  3/1969  O'Brien...................... 307/88 MP X
3,435,249  3/1969  Farrell............................ 307/265 X Primary Examiner—Alfred L. Brody
Attorney—Charles O. Marshall, Jr. et al.

[57] ABSTRACT

A selectable pulse width modulator having first, second, ... $n$th energy storage circuits each having a saturable transformer consisting of a primary winding, a secondary winding and first, second, ... $n$th bias windings, a low potential energy storage means connected to the primary winding of the transformer and a high potential energy storage means connected to the secondary winding of the transformer, a first changeover circuit for selectively connecting the low potential energy storage means of the energy storage circuits to a DC power source, an elecronic switching circuit for discharging the charge stored in the low potential energy storage means of the energy storage circuits, a load connected to the high potential energy storage means of the energy storage circuits, and a second changeover circuit for connecting to a DC power source a $j$th series circuit ($j = 1, 2, ... n$) consisting of $j$th bias windings of the transformers of the energy storage circuits, the $j$th bias winding of the $j$th energy storage circuit in the $j$th series circuit being opposite in polarity to those of the other energy storage circuits.

4 Claims, 1 Drawing Figure

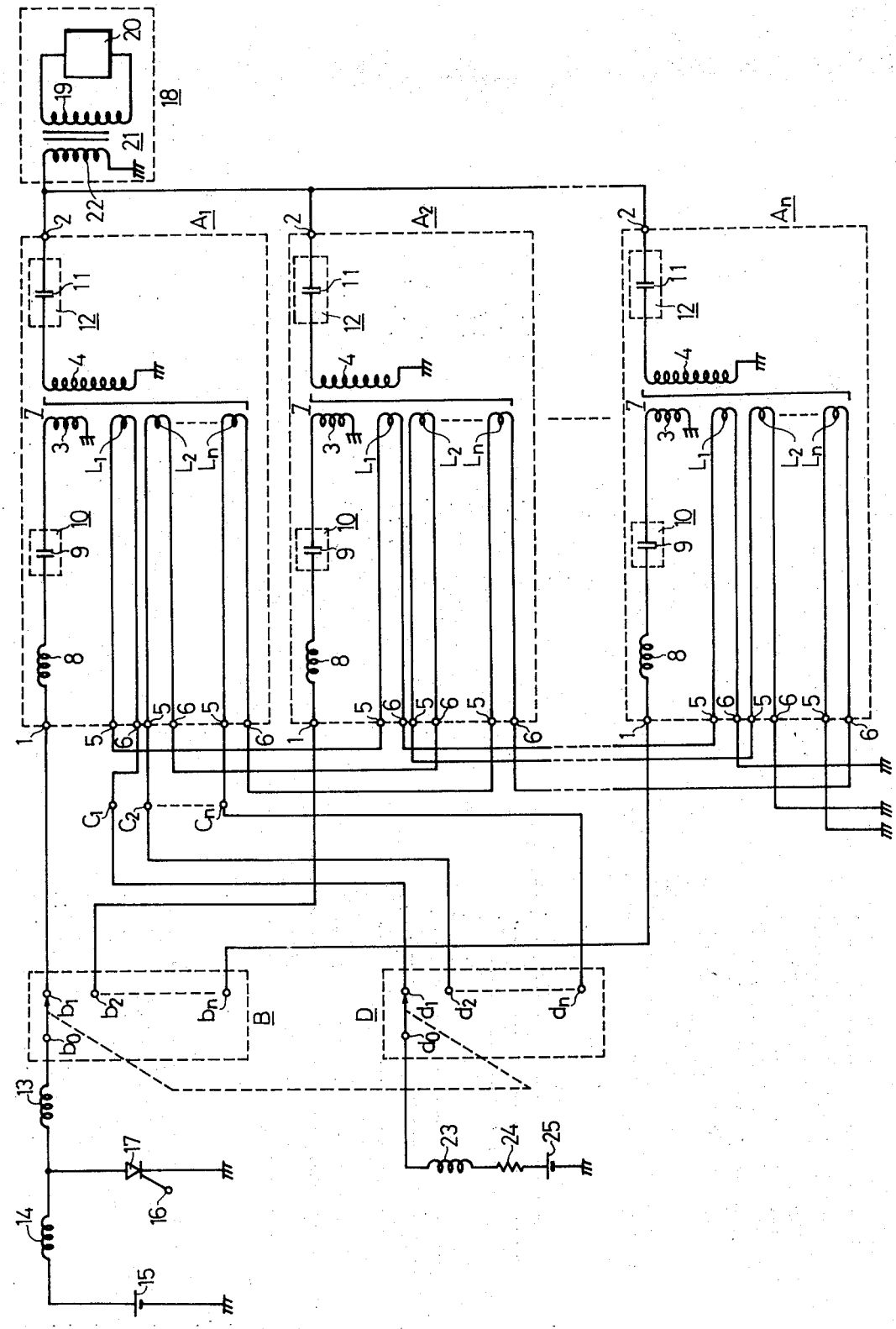

SELECTABLE PULSE WIDTH MODULATOR

BACKGROUND OF THE INVENTION

1. Field of the Invention

This invention relates to a selectable pulse width modulator with which it is possible to obtain selected one of a plurality of pulse outputs of different widths.

2. Description of the Prior Art

Conventional types of pulse width modulators require many changeover switches and relay circuits for obtaining selected one of a plurality of pulse outputs and are complicated in construction as a whole.

SUMMARY OF THE INVENTION

This invention has for its object to provide a selectable pulse width modulator of simple construction which employs only two switches but with which it is possible to obtain selected one of a plurality of pulse outputs with ease.

BRIEF DESCRIPTION OF THE DRAWING

The accompanying sheet of a Drawing shows a connection diagram of one example of a selectable pulse width modulator of this invention.

DESCRIPTION OF PREFERRED EMBODIMENTS

With reference to the drawing one example of this invention will hereinafter be described in detail. Reference characters $A_1$, $A_2$, ... $A_n$ indicate first, second, ... $n$th energy storage circuits respectively each of which has input and output terminals 1 and 2. Each of the energy storage circuits $A_1$ to $A_n$ is made up of a saturable transformer 7 consisting of a primary winding 3 grounded at one end, a secondary winding 4 grounded at one end of $n$'s bias windings $L_1$, $L_2$, ... $L_n$ each having connected thereto a pair of terminals 5 and 6, a low-potential energy storage means 10 including at least a capacitor 9 connected at one end to the input terminal 1 through an inductor 8 and at the other end to the other end of the primary winding 3 and a high-potential energy storage means 12 including at least a capacitor 11 connected at one end to the other end of the secondary winding 4 and at the other end to the output terminal 2.

The input terminals 1 of the circuits $A_1$, $A_2$, ... $A_n$ are respectively connected to fixed contacts $b_1$, $b_2$, ... $b_n$ of a changeover switch B having a movable contact $b_0$ connected through inductors 13 and 14 to the one end of a DC power source 15 grounded at the other end, while a semiconductor controlled rectifier element 17 having a control terminal 16 is connected between the connection point of the inductors 13 and 14 and ground.

The output terminals 2 of the circuits $A_1$ to $A_n$ are connected to each other and further connected to the one end of a primary winding 22 of an output transformer 21 of a load circuit 18, the other end of the primary winding 22 being grounded and the output transformer 21 having a load 20 connected between both ends of a secondary winding 19.

The terminal 5 of the bias winding $L_1$ of the transformer 7 of the circuit $A_1$ is connected to that 5 of the bias winding $L_1$ of the transformer 7 of the circuit $A_2$, the terminal 6 of the winding $L_1$ of the transformer 7 of the circuit $A_2$ is connected to that 5 of the winding $L_1$ of the transformer 7 of the circuit $A_3$, ... and the terminal 6 of the winding $L_1$ of the circuit $A_{(n-1)}$ is connected to that 5 of the winding $L_1$ of the circuit $A_n$. Accordingly, the windings $L_1$ of the circuits $A_1$ to $A_n$ are interconnected in series with the polarity of the winding $L_1$ of the circuit $A_1$ being opposite to that of the windings $L_1$ of the other circuits $A_2$ to $A_n$ and the one end of the series circuit, that is, the terminal 6 of the winding $L_1$ of the circuit $A_1$ is connected to a bias terminal $C_1$ and the other end, that is, the terminal 6 of the winding $L_1$ of the circuit $A_n$ is grounded. Further, the terminal 6 of the winding $L_2$ of the circuit $A_1$ is connected to that 6 of the winding $L_2$ of the circuit $A_2$, the terminal 5 of the winding $L_2$ of the circuit $A_2$ is connected to that 5 of the winding $L_2$ of the circuit $A_3$, the terminal 6 of the winding $L_2$ of the circuit $A_3$ is connected that 5 of the winding $L_2$ of the circuit $A_4$, ... the terminal 6 of the winding $L_2$ of the circuit $A_{(n-1)}$ is connected to that 5 of the winding $L_2$ of the circuit $A_n$. Accordingly, the windings $L_2$ of the circuits $A_1$ to $A_n$ are interconnected in series with the polarity of the winding $L_2$ of the circuit $A_2$ being opposite to that of the windings $L_2$ of the other circuits $A_1$ and $A_3$ to $A_n$ and the one end of the series circuit, that is, the terminal 5 of the winding $L_2$ of the circuit $A_1$ is connected to a bias terminal $C_2$ and the other end, that is, the terminal 6 of the winding $L_1$ of the circuit $A_n$ is grounded. Further, the terminal 6 of the winding $L_n$ of the circuit $A_1$ is connected to that 5 of the winding $L_n$ of the circuit $A_2$, the terminal 6 of the winding $L_n$ of the circuit $A_2$ is connected to that 5 of the winding $L_n$ of the circuit $A_3$, ... the terminal 6 of the winding $L_n$ of the circuit $A_{(n-2)}$ is connected to that 5 of the winding $L_n$ of the circuit $A_{(n-1)}$ and the terminal 6 of the winding $L_n$ of the circuit $A_{(n-1)}$ is connected to that 6 of the winding $L_n$ of the circuit $A_n$. Consequently, the windings $L_n$ of the circuits $A_1$ to $A_n$ are interconnected in series with the polarity of the winding $L_n$ of the circuit $A_n$ being opposite to that of the windings $L_n$ of the other circuits $A_1$ to $A_{(n-1)}$ and the one end of the series circuit, that is, the terminal 5 of the winding $L_n$ of the circuit $A_1$ is connected to a bias terminal $C_n$ and the other end, that is, the terminal 5 of the winding $L_n$ of the circuit $A_n$ is grounded. The terminals 5 and 6 of the windings $L_3$ to $L_{(n-1)}$ of the circuits $A_1$ to $A_n$ are also similarly connected.

The bias terminals $C_1$, $C_2$, ... $C_n$ are respectively connected to fixed contacts $d_1$, $d_2$, ... $d_n$ of a changeover switch D having a movable $d_0$ through an inductor 23 and a resistor 24 to the one end of a DC bias power source 25 grounded at the other end. In this case, the changeover switch D is ganged with the aforementioned changeover switch B.

The foregoing has described the construction of one example of this invention. With such an arrangement as described above, assuming that the circuit $A_1$ is selected through the changeover switch B, that is, the movable contact $b_0$ of the switch B is connected with the fixed contact $b_1$ and that the series circuit of the bias windings $L_1$ of the transformers 7 of the circuits $A_1$ to $A_n$ is selected through the changeover switch D, that is, the movable contact $d_0$ of the switch D is connected with the fixed contact $d_1$, there is established a loop of the power source 15 — the inductors 14 and 13 — the contacts $b_0$ and $b_1$ of the switch B — the terminal 1 — the inductor 8 — the capacitor 9 of the energy storage means 10 — the primary winding 3 of the saturable transformer 7 — the power source 1, so that the capacitor 9 of the energy storage means 10 of the circuit $A_1$ is in its charged condition. While, there is established a loop of the power source 25 — the resistor 24 — the inductor 23 — the contacts $d_0^-$ and $d_1$ of the switch D — the terminal $C_1$ — the terminal 6 of the winding $L_1$ of the saturable transformer 7 of the circuit $A_1$ — the winding $L_1$ — the terminal 5 of the winding $L_1$ — the terminal 5 of the winding $L_1$ of the saturable transformer 7 of the circuit $A_2$ — the terminal 6 of the winding $L_1$ — ... the terminal 5 of the winding $L_1$ of the saturable transformer 7 of the circuit $A_n$ — the terminal 6 of the winding $L_1$ — the power source 25. Accordingly, the saturable transformer 7 of the circuit $A_1$ is biased in a first saturated condition in the one saturation region of its saturation characteristic but the saturable transformers 7 of the other circuits $A_2$ to $A_n$ are biased in a second saturated condition in the other saturation region of their saturation characteristic.

Under such conditions, upon application of a trigger pulse to the control terminal 16 of the semiconductor controlled rectifier element 17 from the outside to turn on the element 17, charge stored in the capacitor 9 of the circuit $A_1$ is discharged through the inductor 9 of the circuit $A_1$. Based upon this, a resonance current chiefly due to the capacitor 9 and the inductor 8 of the circuit $A_1$ flows the primary winding 3 of the transformer 7 of the circuit $A_1$, by which the transformer 7 of the circuit $A_1$ is driven into its unsaturated region from the first saturated condition due to its winding $L_1$ to induce high voltage in the second winding 4 of the transformer 7 of the circuit $A_1$. Based upon this, the capacitor 11 of the energy storage means 12 of the circuit $A_1$ is charged through the primary winding 22 of the transformer 21 of the circuit $A_1$ and when charging of the capacitor 11 of the circuit $A_1$ is completed, the transformer 7 of the circuit $A_1$ is put in its second saturated condition and then charge stored in the capacitor 11 of the circuit $A_1$ is discharged through the secondary winding 4 of the transformer 7 of the circuit $A_1$. This causes a discharge current to flow the primary winding 22 of the transformer 21 of the load circuit 18 and, as a result, a pulse output of a width corresponding to a time constant determined including the capacitor 11 of the energy storage means 12 of the circuit $A_1$ is derived in the load 20 connected to the secondary winding 19 of the transformer 21. In this case, if the period of the resonance current flowing to the primary winding 3 of the transformer 7 of the circuit $A_1$, which is based on the conduction of the element 17 chiefly determined by the capacitor 9 and the inductor 8 of the circuit $A_1$, is preselected to exceed the width of the pulse output derived in the load circuit 18, when the capacitor 11 of the transformer 7 of the circuit $A_1$ is charged with the high voltage induced in the secondary winding 4 of the transformer 7 of the circuit $A_1$, the primary winding 22 of the transformer 21 of the load circuit 18 is substantially in its shorted condition, while the output terminal 2 of the circuit $A_1$ is connected to those 2 of the other circuits $A_2$ to $A_n$. Consequently, when the capacitor 11 of the circuit $A_1$ is charged, the capacitors 11 of the other circuits $A_2$ to $A_n$ are also charged but charging currents flowing to the secondary windings 4 of the transformers 7 of the circuits $A_2$ to $A_n$ are in such a direction that the second saturated condition of the transformer 7 of each of the circuits $A_2$ to $A_n$ due to its winding $L_1$ is further emphasized. Therefore, charging of the capacitors 11 of the circuits $A_2$ to $A_n$ is substantially negligible, and accordingly the capacitor 11 of the circuit $A_1$ can effectively be charged substantially without being affected by the other circuits $A_2$ to $A_n$. Further, when charge stored in the capacitor 11 of the circuit $A_1$ is discharged through the secondary winding 4 of its transformer 7 after completion of charging of this capacitor 11, the discharge current is in such a direction that the second saturated condition of the transformer 7 of the circuit $A_1$ at that time is further emphasized, while the output terminal 2 of the circuit $A_1$ is connected to those 2 of the circuits $A_2$ to $A_n$. Accordingly, when the capacitor 11 is discharged the discharge current flows to the secondary windings 4 of the transformers 7 of the other circuits $A_2$ to $A_n$ through their capacitors 11, by which the transformers 7 of the circuits $A_2$ to $A_n$ are driven from their second saturated conditions to the unsaturated regions. In this case, the driving of the transformers 7 of the circuits $A_2$ to $A_n$ is achieved in such a form that the discharge current is voltage divided by the capacitors 11 of the circuits $A_2$ to $A_n$ and, at this time, the width of the pulse output derived in the load circuit 18 is smaller than the period in which the capacitor 11 of the circuit $A_1$ is charged, so that the transformers 7 of the circuits $A_2$ to $A_n$ do not reach their first saturated condition from the second saturated one. Further, the primary windings 3 and the windings $L_2$ to $L_n$ of the transformers 7 of the circuits $A_2$ to $A_n$ are also in their opened condition in terms of DC and the windings $L_1$ of the transformers 7 of the circuits $A_2$ to $A_n$ are substantially in their opened condition in terms of AC due to the presence of the inductor 23, and consequently the primary windings 3 and the windings $L_1$ to $L_n$ of the transformers 7 of the circuits $A_2$ to $A_n$ do not act as loads of the secondary windings 4. Therefore, the transformers 7 of the circuits $A_2$ to $A_n$ are substantially in their opened condition and they do not substantially serve as a parallel load of the load circuit 18, so that when the capacitor 11 of the circuit $A_1$ is discharged, the discharge current effectively flows to the primary winding 22 of the transformer 21 of the load circuit 18. Thus, a pulse output whose width is determined chiefly by the value of the capacitor 11 of the circuit $A_1$ can effectively derived in the load circuit 18.

The foregoing description has been given in connection with the case where the circuit $A_1$ is selected with the changeover switch B and the series circuit of the bias windings $L_1$ of the transformers 7 of the circuits $A_1$ to $A_n$ is selected with the switch D. However, by selecting one (hereinafter referred to as $A_j$) of the other circuit $A_2$ to $A_n$ with the changeover switch B and by selecting the bias windings $L_j$ of the transformers 7 of the circuits $A_1$ to $A_n$ with the switch D, a pulse output whose width is determined by the constant of the energy storage means 12 of the circuit $A_j$ can also be obtained in the load circuit 18 as is the case with the foregoing example.

With the present invention, it is possible to obtain selected one of $n$'s pulse outputs of different widths as described above and such selection can be achieved by means of an extremely simple switching circuit consisting of only two switches, that is, the switch B for selecting one of the circuits $A_1$ to $A_n$ and the switch D for selecting one of the series circuits of the windings $L_1$ to $L_n$ of the transformers of the circuits $A_1$ to $A_n$. By the way, even in the case where one biasing winding (hereinbelow referred to as L) is provided in the transformer 7 of each of the circuits $A_1$ to $A_n$; one of the circuits $A_1$ to $A_n$ is selected by the aforesaid switch B; the bias winding L of the selected circuit (hereinbelow referred to as $A_i$) and the $(n-1)$'s bias windings L of the other circuits than $A_j$ are interconnected in series relation with the winding L of the circuit $A_j$ being opposite in polarity to those L of the other circuits; and this series circuit is connected to the bias power source, it is also possible to obtain the same results as those described above but, in this case, a complicated switching circuit employing a plurality of switches is required for the latter circuit. The present invention necessitates $n$'s bias windings $L_1$ to $L_n$ for the transformer 7 of each of the circuits $A_1$ to $A_n$ and the addition of such windings to the transformers 7 is easy and does not present any problem, since they are small in the number of turn.

The foregoing has described one example of this invention and it should not be construed as limiting this invention specifically thereto. For example, it is possible to omit the bias power source 25 and use the DC power source 15 as a bias power source, too.

It will be apparent that many modifications and variations may be effected without departing from the scope of the novel concepts of this invention.

We claim as our invention:
1. A selectable pulse width modulator comprising:
   a. first, second, ... $n$th energy storage circuits each having an input and an output terminal,
   b. a first changeover circuit for selectively connecting the input terminals of the first, second, ... $n$th energy storage circuits to a DC power source,
   c. an electronic switching circuit for connecting to a reference potential point one of the input terminals of the first, second, ... $n$th energy storage circuits selected by the first changeover circuit,
   d. a load circuit connected to the output terminals of the first, second, ... $n$th energy storage circuits in common thereto, each of the first, second, ... $n$th energy storage circuits including a saturable transformer consisting of a primary winding, a secondary winding and first, second, ... $n$th bias windings, a low potential energy storage means connected at one end to the input terminal and at the other end to the primary winding of the saturable transformer and a high potential energy storage means connected at one end to the secondary winding of the saturable transformer and at the other end to the output terminal, the time constants of the first, second, ... $n$th energy storage circuits determined including the high potential energy storage means being different from one another, the first bias windings of the first, second, ... $n$th energy storage circuits being interconnected in series relation with the first bias winding of the first energy storage circuit being opposite in polarity to those of the other second, third, ... $n$th energy storage circuits and the series circuit being connected at a first bias terminal, the second bias windings of the first, second, ... $n$th energy storage circuits being interconnected in series relation with the second bias winding of the second energy storage circuit being opposite in polarity to those of the other first, third, ... $n$th energy storage circuits and the series circuits being connected to a second bias terminal, ... the $n$th bias windings of the first, second, ... $n$th energy storage circuits being interconnected in series relation with the $n$th bias winding of the $n$th energy storage circuit being opposite in polarity to those of the other first, second, ... $(n-1)$th energy storage circuits and the series circuit being connected to an nth bias terminal, and
   e. a second changeover circuit for selectively connecting the first, second, ... $n$th bias terminals to a bias power source, the second changeover circuit ganged with the first changeover circuit.

2. A selectable pulse width modulator according to claim 1, wherein the low potential and high potential energy storage means of the first, second, ... $n$th energy storage circuits are formed with capacitors respectively.

3. A selectable pulse width modulator according to claim 2, wherein each of the first, second, ... $n$th energy storage circuits has an inductor connected between its input terminal and the low potential energy storage means.

4. A selectable pulse width modulator according to claim 1, wherein the load circuit is formed with an output transformer consisting of a primary winding connected to the output terminals of the first, second, ... $n$th energy storage circuits and a secondary winding having connected thereto a load.

* * * * *